United States Patent [19]

Mitsui et al.

[11] Patent Number: 5,415,947
[45] Date of Patent: May 16, 1995

[54] BATTERY CARTRIDGE HAVING A RECESS FOR DETECTING MISUSE AND/OR RECESSED TERMINALS

[75] Inventors: Hidero Mitsui; Toshitaka Takei; Masaru Hiratsuka, all of Kanagawa, Japan

[73] Assignee: Sony Corporation, Japan

[21] Appl. No.: 65,368

[22] Filed: May 24, 1993

[30] Foreign Application Priority Data

May 29, 1992 [JP] Japan ................... 4-036562
May 29, 1992 [JP] Japan ................... 4-139358
May 29, 1992 [JP] Japan ................... 4-139359

[51] Int. Cl.⁶ .................................. H01M 2/10
[52] U.S. Cl. ........................... 429/1; 429/90; 429/99; 429/123
[58] Field of Search ............... 429/1, 90, 96, 99, 100, 429/123

[56] References Cited

U.S. PATENT DOCUMENTS

| | | | |
|---|---|---|---|
| 2,225,460 | 12/1940 | Porth . | |
| 2,266,686 | 12/1941 | Emanuel . | |
| 3,667,026 | 5/1972 | Bogut et al. | 320/36 |
| 3,917,990 | 11/1975 | Sherman, Jr. | 320/35 |
| 4,006,396 | 2/1977 | Bogut | 320/2 |
| 4,123,598 | 10/1978 | Hammel | 429/159 |
| 4,315,364 | 2/1982 | Leffingwell | 29/623.1 |
| 4,329,406 | 5/1982 | Dahl et al. | 429/92 |
| 4,468,605 | 8/1984 | Fitzgerald et al. | 320/36 |
| 4,530,034 | 7/1985 | Kawarada | 362/9 |
| 4,576,880 | 3/1986 | Verdier et al. | 429/99 |
| 4,637,965 | 1/1987 | Davis | 429/1 |
| 4,737,420 | 4/1988 | Ikeda et al. | 429/1 |
| 4,943,498 | 7/1990 | Cooper et al. | 429/97 |
| 4,969,206 | 11/1990 | Desrochers | 429/1 X |
| 4,997,731 | 3/1991 | Machida et al. | 429/90 |
| 5,057,383 | 10/1991 | Sokira | 429/92 |
| 5,111,128 | 5/1992 | Branan, Jr. et al. | 320/2 |
| 5,183,714 | 2/1993 | Mitsui et al. | 429/123 |
| 5,200,686 | 4/1993 | Lee | 429/7 X |
| 5,208,116 | 5/1993 | Joh | 429/123 X |
| 5,227,262 | 7/1993 | Ozer | 429/90 X |
| 5,248,927 | 9/1993 | Takei et al. | 429/99 X |

FOREIGN PATENT DOCUMENTS

| | | |
|---|---|---|
| 0480706 | 4/1992 | European Pat. Off. . |
| 0549950 | 7/1993 | European Pat. Off. . |
| 0572327 | 12/1993 | European Pat. Off. . |
| 9112374 | 1/1992 | Germany . |
| 59-167098 | 9/1984 | Japan . |
| 1487604 | 10/1977 | United Kingdom . |
| 9211679 | 7/1992 | WIPO . |

OTHER PUBLICATIONS

Sony Rechargeable Battery Pack, NP-55/55H/66/66H/77/77H Instruction Sheet (date unknown).
European Search Report, Dec. 20, 1993.
Sony Rechargeable Battery Pack, NP-60D Instruction Sheet (Date unknown).

*Primary Examiner*—Stephen Kalafut
*Attorney, Agent, or Firm*—Ronald P. Kananen

[57] ABSTRACT

A battery pack having a detection recess formed along a center line of a bottom surface arranged such that the detection recess is engaged with a convexed portion of a battery charger. Therefore, whether or not the battery pack is properly attached to the battery charger can easily be detected by the inclination of the battery pack about the center line. Further, a battery pack is arranged such that an aperture is formed on an outer surface of the battery pack and an output terminal is inwardly disposed on the aperture. Therefore, damage to the batteries in the battery pack caused by a short-circuit resulting from products made of conductive metal material such as a key ring, necklace, or chain contacting both of the output terminals, as occurs when terminals are disposed on the outer surface of the battery pack, can be prevented. Furthermore, the battery pack includes apertures with output terminals disposed therein for discharging dust or the like away from the terminals into the interior of the casing or out of the casing through a hole. Therefore, the accumulation of dust or the like within the apertures and upon the output terminals is prevented.

26 Claims, 17 Drawing Sheets

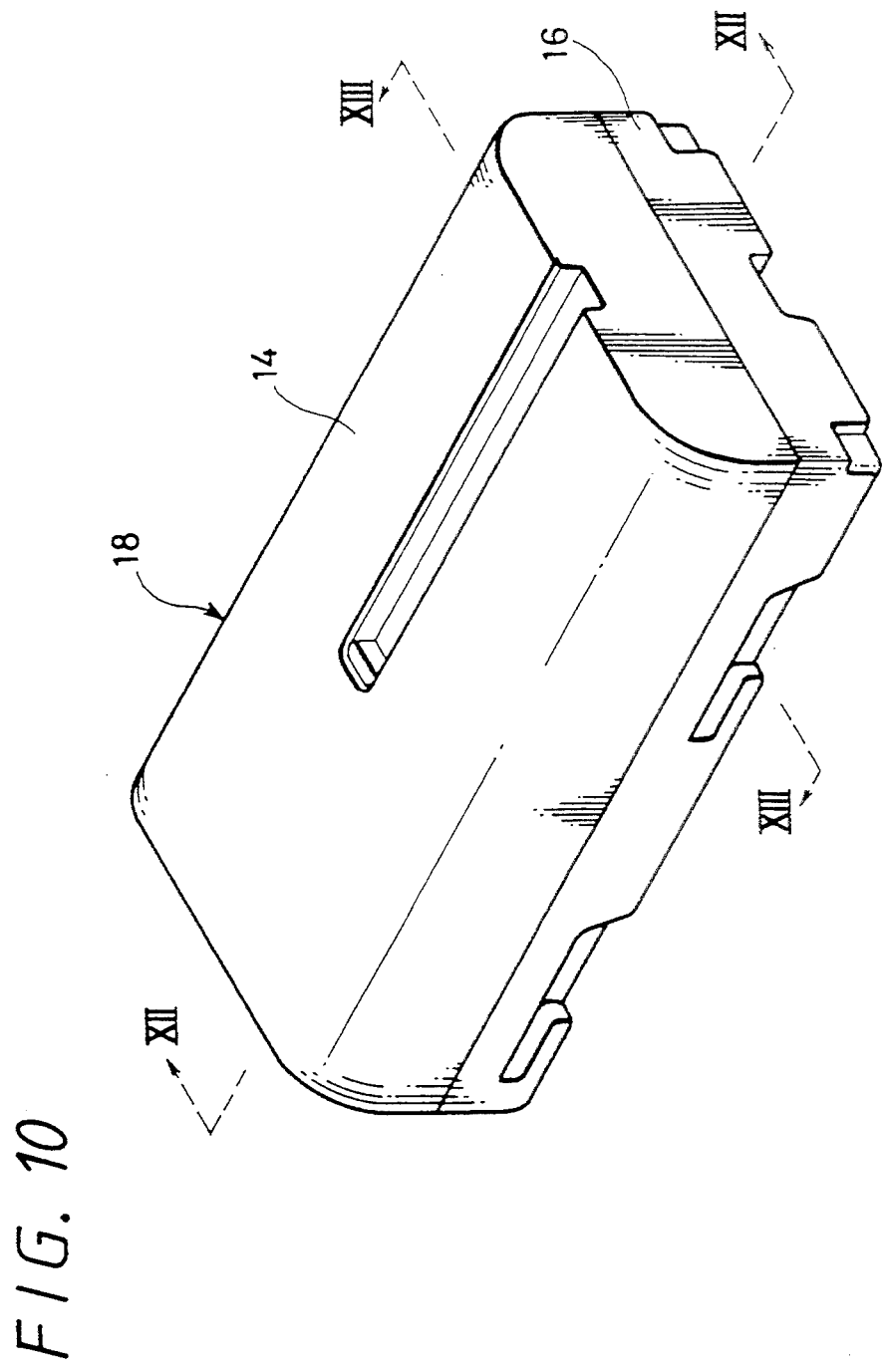

BATTERY CARTRIDGE HAVING A RECESS FOR DETECTING MISUSE AND/OR RECESSED TERMINALS

FIELD OF THE INVENTION

The present invention relates to a battery cartridge or battery pack having a plurality of batteries accommodated therein for use in a DC (direct current) power supply of electrical machinery and apparatus.

BACKGROUND OF THE INVENTION

An example of a conventional battery cartridge (hereinafter referred to as a battery pack) that has previously been disclosed in Japanese patent application No. 3-52555 to the same assignee of the present application will be described below.

FIG. 1 of the accompanying drawings shows battery charger 12 with a battery pack 10 attached and FIG. 2 shows an example of such battery charger 12 without a battery pack attached.

As illustrated, the battery charger 12 is a molded product of a plastic material and has a recessed portion 51 onto which the battery pack 10 is attached. The battery charger 12 comprises a primary circuit portion 52 having a power supply transformer or the like and a secondary circuit portion 53 having a rectifying circuit or the like. The battery charger 12 further includes an AC (alternating current) cord 54 having a plug connected to the primary circuit portion 52.

As shown in FIG. 2, the secondary circuit portion 53 includes an adaptor plug 55 from which a DC power is supplied, first and second terminals 56, 57 from which a charging power is supplied and a third terminal 58 from which a temperature detecting signal is input to the battery charger 12. The adaptor plug 55 is provided so that the electrical machinery and apparatus can be operated by directly utilizing a DC power supplied from the AC power supply instead of the battery pack 10.

The three terminals 56, 57 and 58 are formed as leaf springs so that they can be deformed flexibly. A spring constant of the third terminal 58 is selected to be substantially ⅔ of those of the first and second terminals 56, 57. The first, second and third terminals 56, 57, 58 are assembled into a molded plate 60 and the molded plate 60 is disposed on the bottom surface of the recessed portion 51. The molded plate 60 is colored a in proper color such as blue or the like, which is different from the color (black) of the case 59 of the battery pack 10.

The secondary circuit portion 53 includes a control circuit (not shown). The control circuit is operated to control the charging of the battery within the battery pack 10 and controls the charging state of the battery on the basis of a so-called- V charging completion method in which a voltage between the first and second terminals 56, 57 is progressively increased by the start of the charging and the charging is ended when the voltage is lowered a little after the voltage had reached the peak value.

The aforesaid control circuit detects the temperature of a battery that is being charged on the basis of a temperature detecting signal from a temperature detecting element provided on the bottom surface of the battery pack 10. When such detected temperature of the battery exceeds a predetermined value, the control circuit interrupts a charging current supplied from the first and second terminals 56, 57 to the battery thereby to disable the battery charger 12 from charging the battery.

As shown in FIG. 1, the battery pack 10 includes a casing 18 that comprises an upper casing 14 and a bottom casing 16. The casing 18 is so arranged as to accommodate therein a plurality of batteries.

FIGS. 3A and 3B show the battery pack 10 with cylindrical batteries 21 through 25 accommodated within the battery pack 10. More specifically, FIG. 3A is a diagram showing the inside of the battery pack 10 with the bottom casing 16 removed. FIG. 3B is a cross-sectional view taken along the line III—III in FIG. 3A.

The batteries 21 through 25 may be nickel-hydrogen secondary batteries and are arranged in parallel to one another as shown in FIGS. 3A and 3B. The electrodes of the batteries 21 to 25 are connected by means of conductive plates 32. Hence, the five batteries 21 to 25 are constructed as a combination battery 27 in which the batteries 21 to 25 are electrically connected in series. An insulating sheet 34 is disposed between the electrodes of the batteries 21 to 25 and the conductive plates 32.

The combination battery 27 includes first and second electrodes 36 and 38 of positive and negative polarities for effecting the charging and discharging. A temperature detecting element 42 such as a thermistor or the like and a breaker (not shown) are disposed under the two electrodes 36, 38. The first and second electrodes 36, 38, the temperature detecting element 42 and the breaker (not shown), etc., are supported by a molded member 44 disposed between the two batteries 21 and 22.

The electrodes 36, 38 of the combination battery 27 constitute output terminals of the battery pack 10. Hence, the electrodes 36, 38 will be referred to as output terminals 36, 38, if necessary.

A third electrode 40 that outputs a temperature detecting signal is further disposed under the battery 21. The third electrode 40 is formed as a thin plate that constitutes a leaf spring. The third electrode 40 may be directly bonded to the battery 21 by an adhesive or attached to the molded member 44.

Two lead wires 42A and 42B are connected to the temperature detecting element 42. The temperature detecting element 42 is connected to the first electrode 36 by means of the first lead wire 42A, and the temperature detecting element 42 is connected to the third electrode 40 by means of the second lead wire 42B.

The combination battery 27 and the three electrodes 36, 38 and 40 are disposed so as to contact with the inner surface of the upper casing 14.

FIG. 4 shows a configuration of the bottom surface of the casing 18, i.e., the outer surface of the bottom casing 16. The bottom casing 16 has on its outer surface eleven recessed portions 16A through 16K formed and three through-holes 16a, 16b and 16c bored therethrough. Of the three through-holes 16a, 16b and 16c, the two through-holes 16a, 16b are bored through the recessed portions 16D and 16E, respectively.

The three through-holes 16a, 16b, 16c are bored through the outer surface of the bottom casing 16 at their positions corresponding to the three electrodes 36, 38 and 40 of the battery pack 10. Therefore, when the upper casing 14 is covered with the bottom casing 16 to form the casing 18 and the batteries 21 to 25 are accommodated within the casing 18, the three electrodes 36, 38, 40 are exposed from the corresponding three throughholes 16a, 16b, 16c, respectively.

The eight recessed portions 16C through 16J and the two through-holes 16a, 16b are disposed in association with spacings 28A through 28D of the batteries 21 to 25.

As shown in FIG. 4, on the outer surface of the bottom casing 16, symbols +, − and ⊥ encircled by the symbol ○, which are adjacent to the three electrodes 36, 38, 40, are formed. These symbols are formed by forming concavities and convexities on the form of the bottom casing 16 when the plastic material is molded.

The bottom casing 16 is colored in black and the portion within a dashed line 20 encircling the three through-holes 16a, 16b, 16c is colored in another color such as blue.

On the bottom surface of the recessed portion 51 of the battery charger 12, convexes portions 61A, 61B, 61C are formed. The convex portions 61A, 61B, 61C are disposed so as to be engaged with the corresponding recessed portions 16I, 16G, 16H of the battery pack 10.

Of such recessed portions 16I, 16G and 16H, the outside recessed portions 16I, 16G are referred to as detection apertures and the inside larger recessed portion 16H is referred to as a locking aperture. The detection apertures 16I, 16G function to detect whether or not the battery pack 10 is properly attached to the battery charger 12 or the like.

When the battery pack 10 is properly attached to the battery charger 12, the two convexed portions 61A, 61B are properly inserted into the detection apertures 16I, 16G, respectively. Whereas, when the battery pack 10 is not properly attached to the battery charger 12, the two convexed portions 61A, 61B are not inserted into the corresponding recessed portions 16I, 16G and the bottom surface of the battery pack 10 is caused to rise from the bottom surface of the recessed portion 51 of the battery charger 12.

The locking aperture 16H functions to support the battery pack 10 so that the battery pack 10 attached to the battery charger 12 is prevented from being moved uselessly during charging.

When the proper battery pack 10 is attached to the battery charger 12, the three electrodes 36, 38, 40 of the combination battery 27 exposed from the through-holes 16a, 16b, 16c of the bottom casing 16 are respectively brought in contact with the three terminals 56, 57, 58 of the battery charger 12.

Since either of the three electrodes 36, 38, 40 and the three terminals 56, 57, 58 are formed of the members that can be deformed with flexibility, e.g., leaf springs are described above, both of the three electrodes 36, 38, 40 and the three terminals 56, 57, 58 can be reliably brought in contact with one another by spring force of such resilient members. As described above, the spring constant of the third terminal 58 is selected to be small as compared with those of other remaining terminals 56 and 57 so that, even when the battery pack 10 without the third electrode 58 is attached to the battery charger 12, the bottom surface of the battery pack 10 can be protected from being damaged.

In the aforesaid example of the prior art, the bottom casing 16 of the battery pack 10 includes the detection apertures 16I, 16G and whether the battery pack 10 can be properly attached to the battery charger 12 is determined by detecting whether or not the convexed portions 61A, 61B on the bottom surface of the recessed portion 51 of the battery charger 12 are properly engaged with the detection apertures 16I, 16G. This arrangement can be can be utilized not only between the battery pack 10 and the battery charger 12 but also between the battery pack 10 and electrical machinery and apparatus that utilizes the battery pack 10 as a power source.

In the aforesaid battery pack 10, i.e., the output terminals 36, 38 are exposed from the apertures 16a, 16b.

When the battery pack 10 is not properly attached to the battery charger 12, the battery pack 10 is caused to rise from the battery charger 12 by an amount corresponding to the height of the convexed portions 61A, 61B and then inclined. If an inclination angle of the battery pack 10 is large, whether or not the battery pack 10 is properly attached to the battery charger 12 can easily be detected. If on the other hand, the inclination angle is small, then it becomes more difficult to detect whether or not the battery pack 10 is properly attached to the battery charger 12.

In order to increase the inclination angle, the heights of the convexed portions 61A, 61B of the battery charger 12 must be increased and the depths of the detection apertures 16I, 16G of the battery pack 10 must be increased, which, however, makes the molding treatment of the battery charger 12 and the bottom casing 16 impossible.

To increase the inclination angle of the battery pack 10 without changing the heights of the convexed portions 61A, 61B of the battery charger 12, the convexed portions 61A, 61B of the battery charger 12 and the detection apertures 16I, 16G of the battery pack 10 must be formed at the positions nearer to the center position.

In the aforesaid example of the prior art, as shown in FIG. 4, the detection apertures 16I, 16G are bored through the bottom casing 16 of the battery pack 10 side by side at one of its side portion and are not formed at the center thereof.

Further, the battery pack 10 has mounted thereon an identification marker (not shown) that indicates the condition that the battery was already utilized and charged. Such identification marker is disposed at a front end portion 16-1 (see FIG. 3B) of the bottom casing 16 of the battery pack 10 so that the dimension of the battery pack 10 is increased in its longitudinal direction by an amount corresponding to the protruded portion of the identification marker.

FIGS. 5A, 5B and FIGS. 6A, 6B show other examples of the conventional battery pack 10. In these examples of the conventional battery pack 10, the electrodes 36, 38, i.e., output terminals 36, 38, are disposed at positions different from those of the example shown in FIG. 4. However, the electrodes 36, 38, i.e., output terminals 36, 38, are both exposed on the outer surface of the casing 18. Thus, there is the risk that the batteries within the battery pack 10 will be damaged when the electrodes 36, 38, i.e., output terminals 36, 38, are short-circuited by conductive metal products such as a key ring, a necklace, a chain or the like.

It is another problem that dust or the like may collect on the electrodes which could result in the electrical connection between the electrodes and the connection terminals of the battery charger or electrical machinery and apparatus to fail.

OBJECTS AND SUMMARY OF THE INVENTION

Accordingly, it is an object of the present invention to provide an improved battery pack in which the aforesaid shortcomings and disadvantages encountered with the prior art can be eliminated.

More specifically, it is an object of the present invention to provide a battery pack in which it easily can be determined whether or not a battery pack is properly attached to a battery charger.

It is another object of the present invention to provide a battery pack having an identification marker formed thereon without sacrificing the volume of the inside of the casing.

It is a further object of the present invention to provide a battery pack in which short circuits in battery electrodes, i.e., output terminals, resulting from contact with conductive metal products such as a key ring, a necklace, a chain or the like can be prevented.

It is a still further object of the present invention to provide a battery pack in which the collection of dust or the like in a recessed portion formed on the outer surface of a casing, i.e., hole, can be prevented.

According to a first aspect of the present invention, a battery pack having a battery accommodated therein which comprises a detection aperture formed along a center line of a bottom surface is provided.

According to a second aspect of the present invention, a battery pack which comprises an output terminal formed on the inside of a hole bored through an outer surface of a casing is provided.

In accordance with a third aspect of the present invention, there is provided a battery pack in which an output terminal is disposed within a concave portion formed on an outer surface of a casing. This battery pack comprises an aperture bored through the inner surface of the concave portion.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 10 is a perspective view illustrative of an appearance of a battery pack according to a first embodiment of the present invention;

DETAILED DESCRIPTION OF THE PREFERRED EMBODIMENTS

Figure 1:
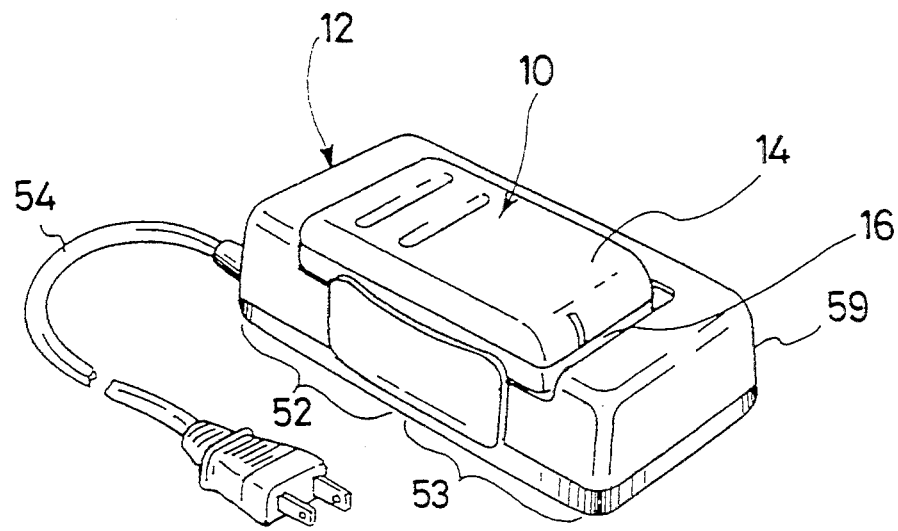
FIG. 1 is a perspective view illustrative of an example of a conventional battery pack attached to a battery charger.
Figure 2:
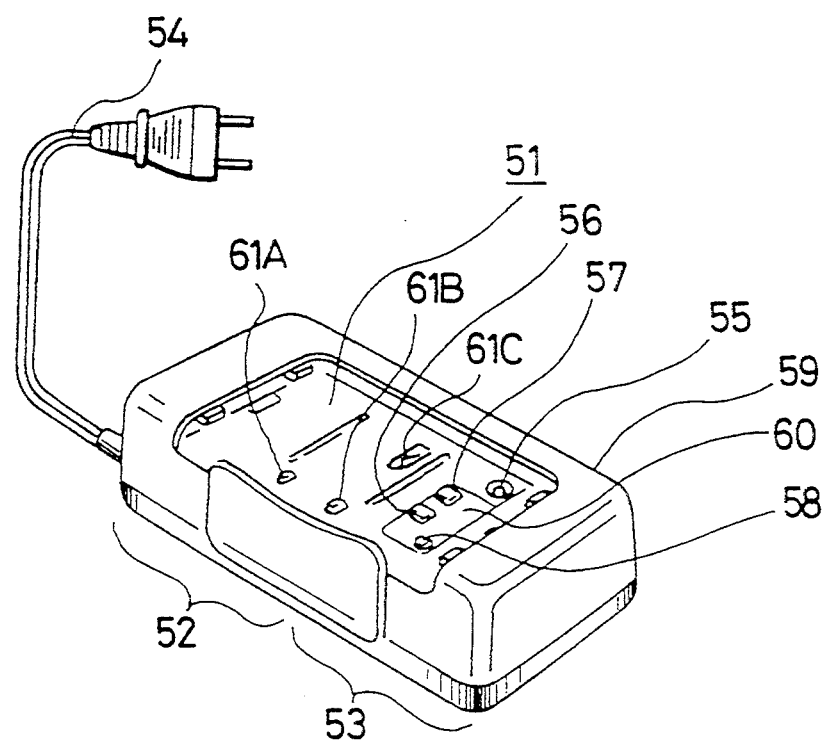
FIG. 2 is a perspective view illustrative of an example of a conventional battery charger.
Figure 3A:
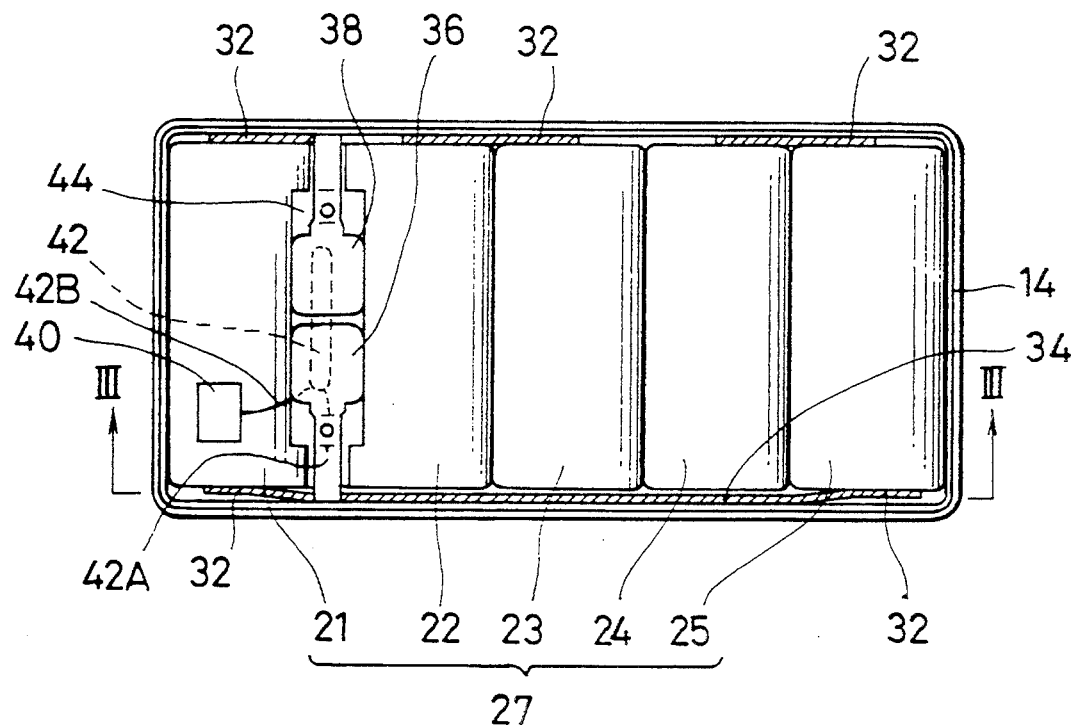
FIG. 3A is a diagram used to explain an example of the conventional battery pack.
Figure 3B:
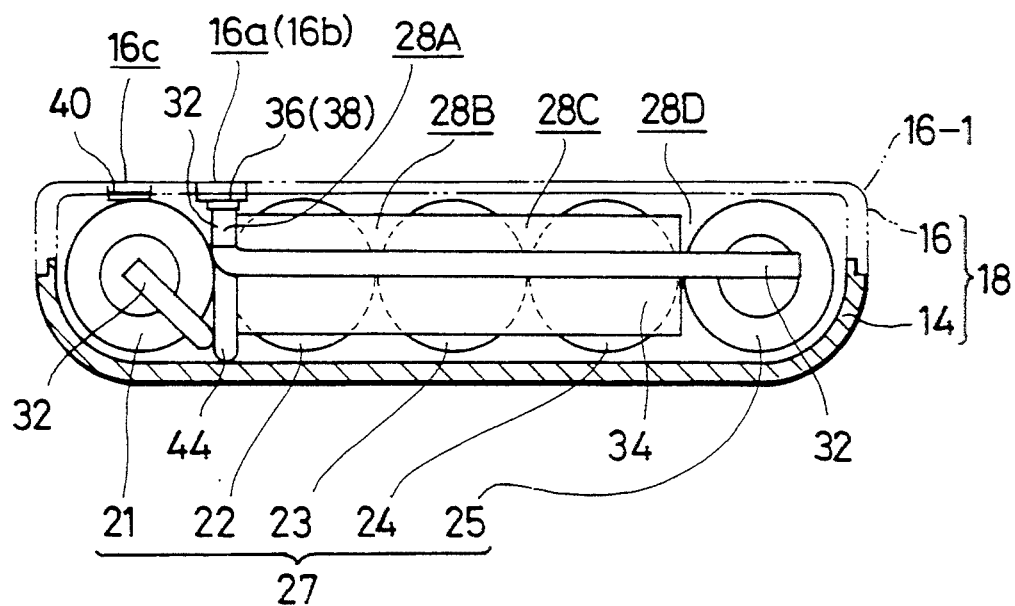
FIG. 3B is a cross-sectional view taken along the line III—III in FIG. 3A.
Figure 4:
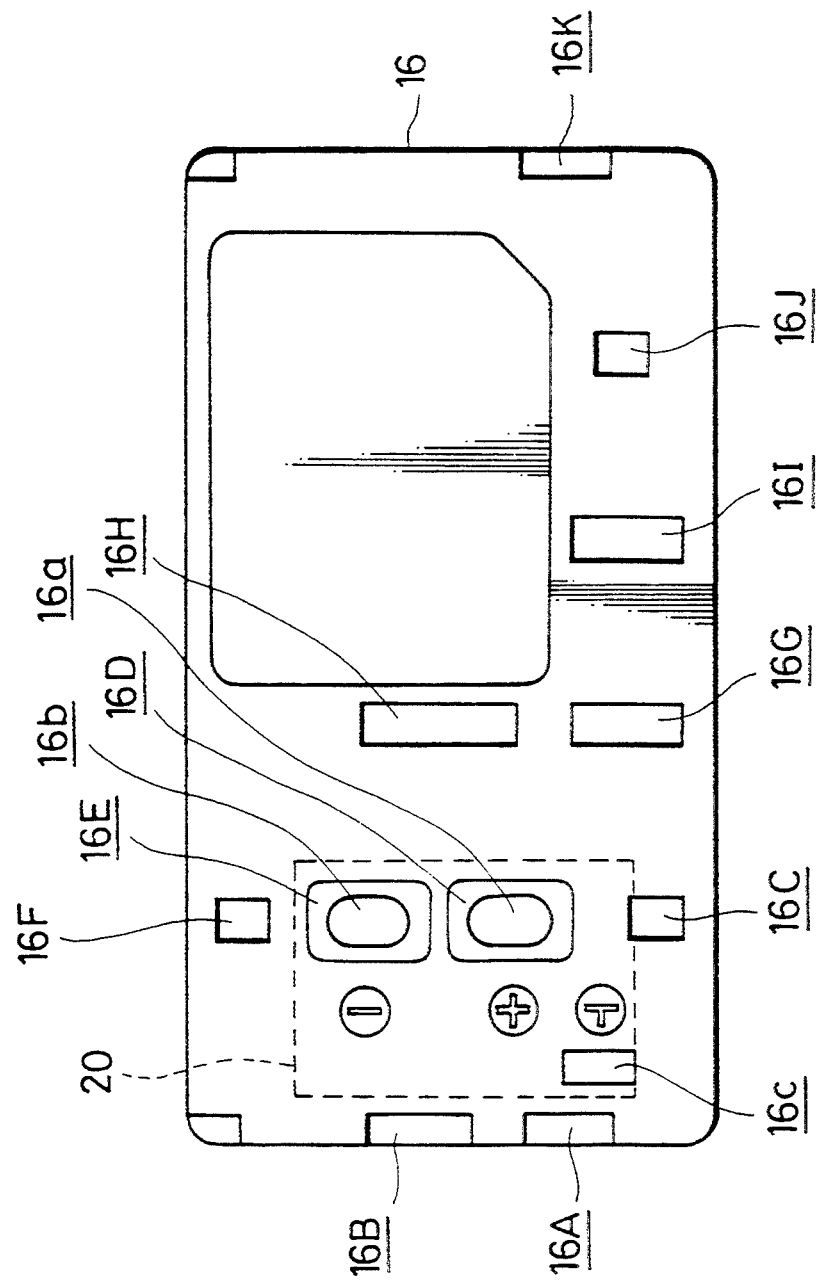
FIG. 4 is a bottom view illustrative of an example of the conventional battery pack.
Figure 5A:
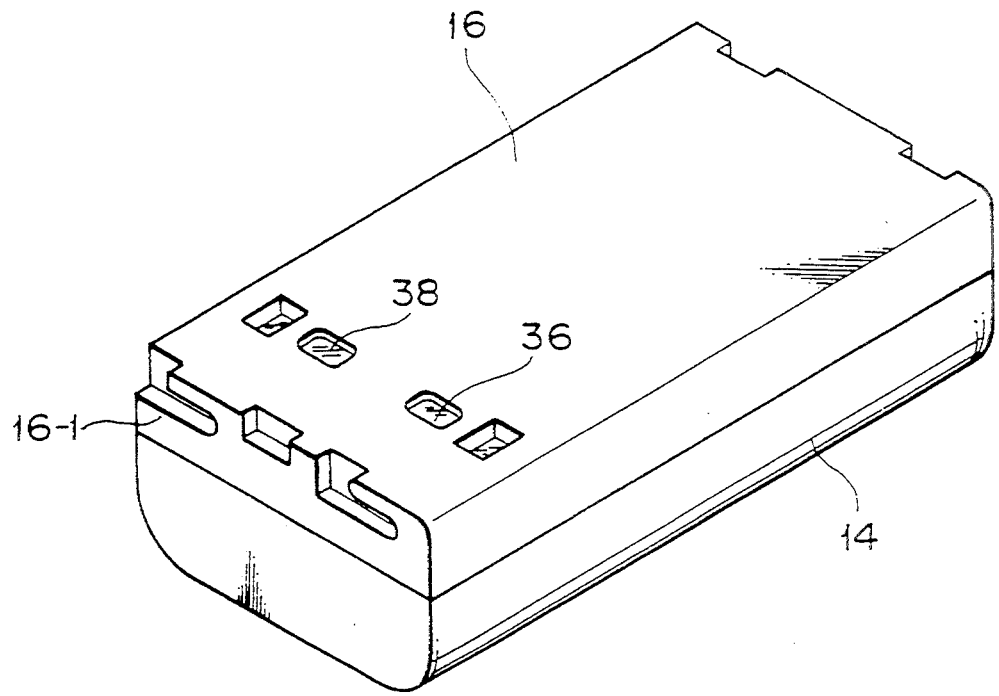
FIGS. 5A, 5B and FIGS. 6A, 6B are perspective views illustrative of examples of conventional battery packs, respectively.
Figure 5B:
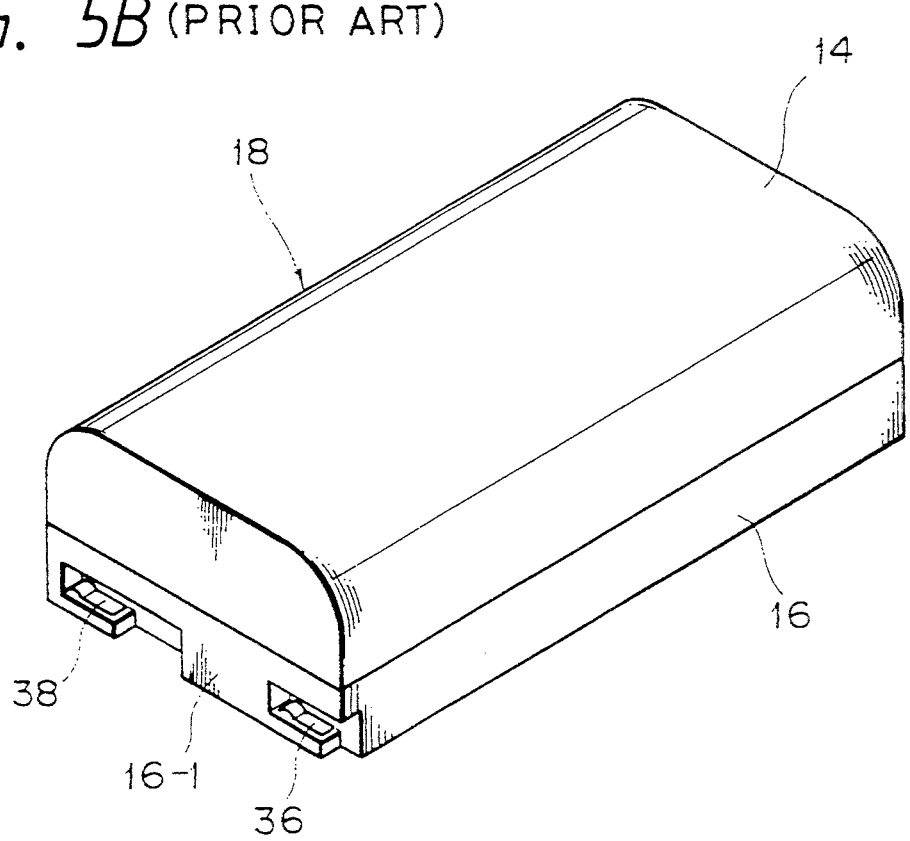
Figure 6A:
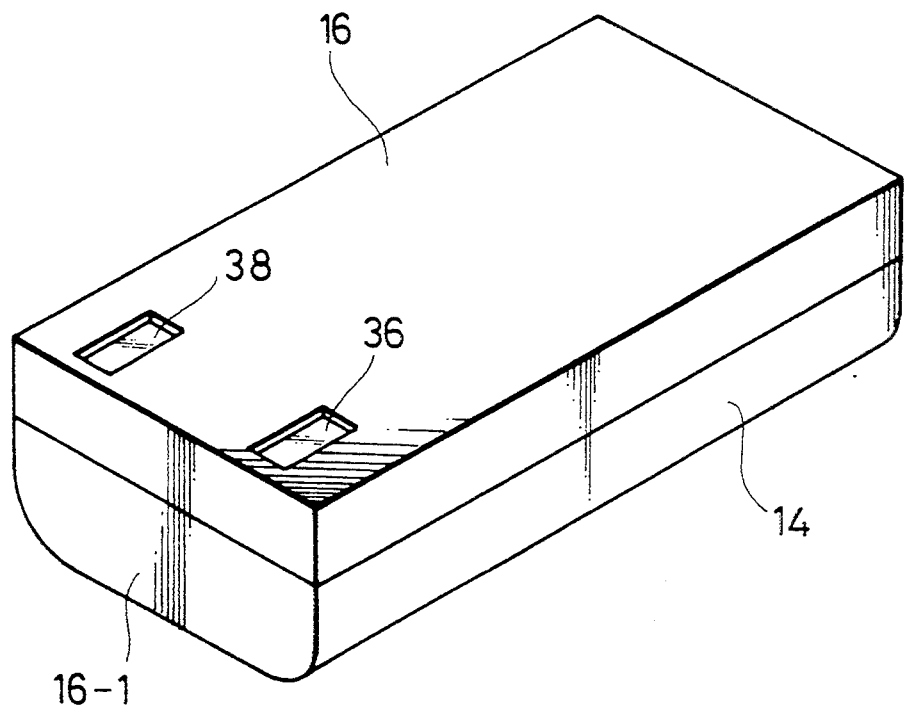
Figure 6B:
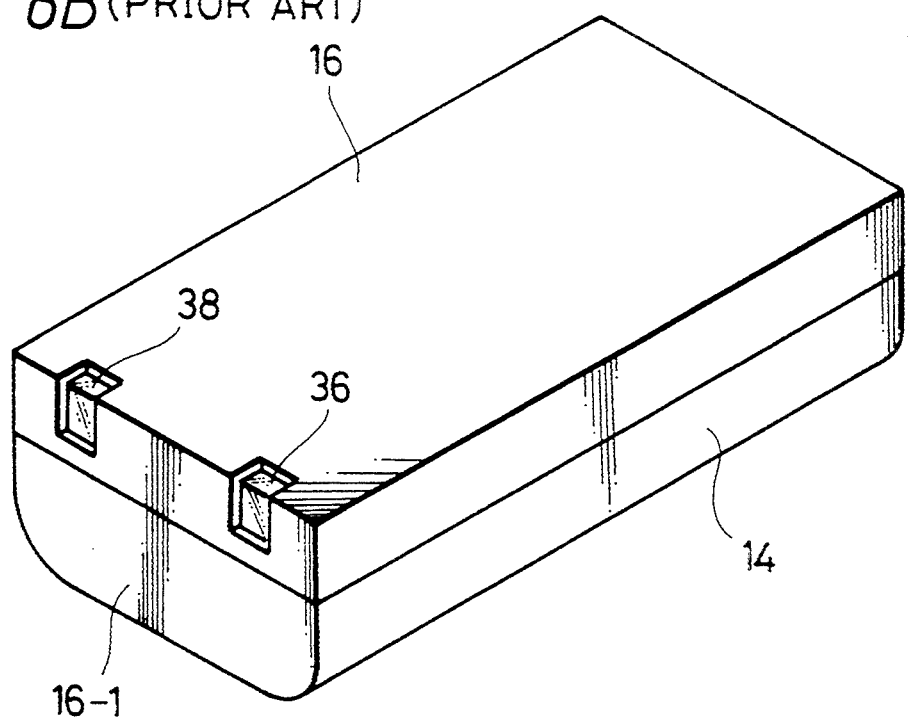

Referring to the drawings in detail, and initially to FIGS. 7 to 16, a battery pack according to a first embodiment of the present invention will be described below. In FIGS. 7 to 16, like parts corresponding to those of FIGS. 1 to 4 are marked with the same references and therefore need not be described in detail.

Figure 7:
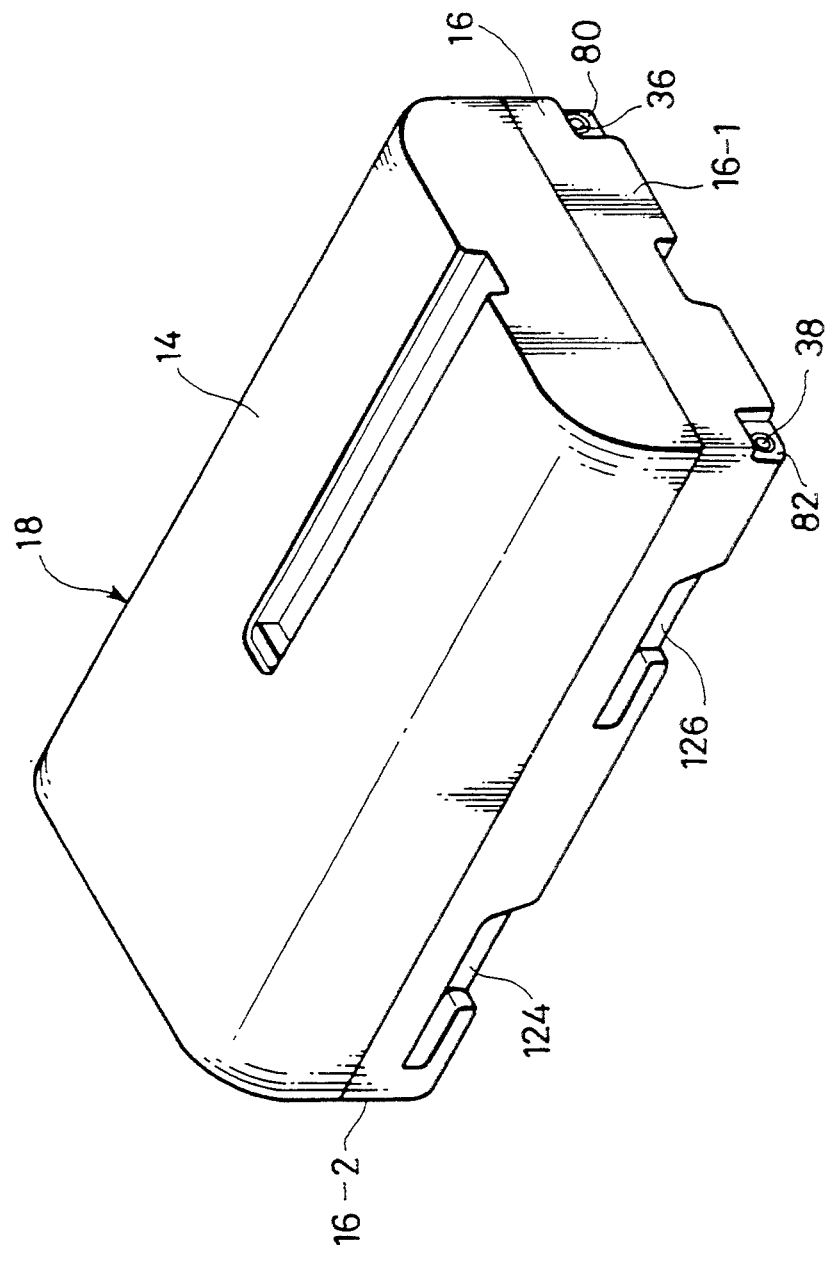
FIG. 7 is a perspective view illustrative of a battery pack used in an embodiment of the present invention.

FIG. 7 is a perspective view illustrative of an appearance of the battery pack 10 of the instant invention. As shown in FIG. 7, the battery pack 10 includes the casing 18 which comprises the upper casing 14 and the bottom casing 16.

In this example, cylindrical batteries are disposed in two rows within the battery pack 10 and four batteries are accommodated within the battery pack 10 in total. Such four batteries may be electrically connected in series to form a combination battery.

Around the bottom surface of the battery pack 10, there are formed holes 120, 122, 124, 126 (only the holes 124, 126 are shown in FIG. 7). These holes 120 to 126 are adapted to receive corresponding protruded portions formed on a battery accommodating portion when the battery pack 10 is attached to the battery accommodating portion of electrical machinery and apparatus.

As shown in FIG. 7, concave portions 80, 82 are formed on the front end portion 16-1 of the bottom casing 16 and the first and second electrodes 36, 38 of the combination battery are disposed at the bottom surfaces of the concave portions 80, 82.

The electrodes 36, 38 function as charging electrodes when the battery pack 10 is attached to the battery charger to charge the batteries. Also, the electrodes 36, 38 function as power supply electrodes when the battery pack 10 is attached to the electrical machinery and apparatus to supply power.

Figure 8A:
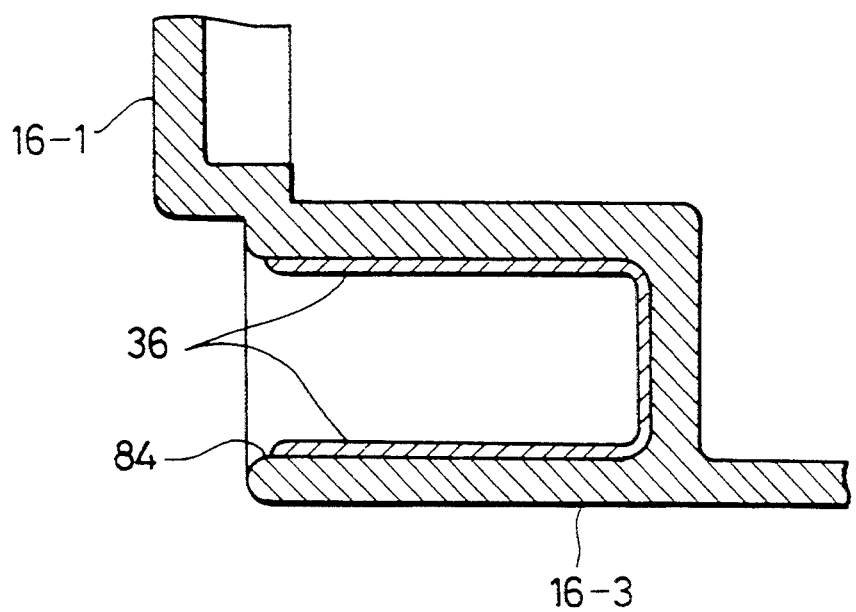
FIG. 8A is a fragmentary cross-sectional view illustrative of a front end portion of a bottom casing of the battery pack shown in FIG. 7.
Figure 8B:
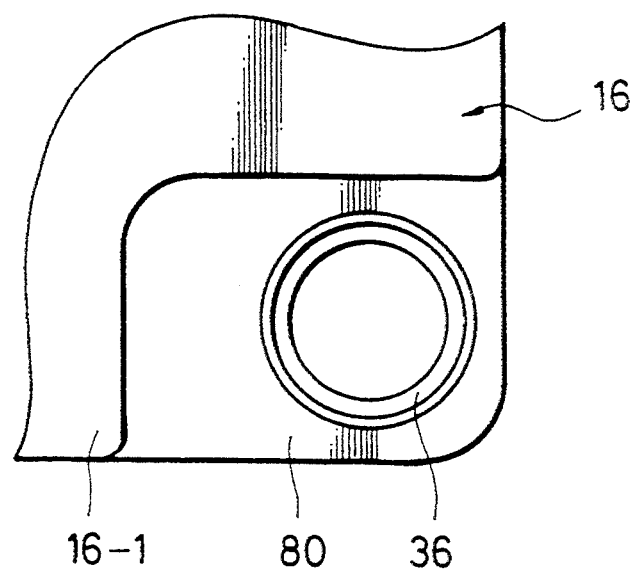
FIG. 8B is a front view thereof.

FIGS. 8A and 8B show an example of a structure of the first electrode 36 disposed on the concave portion 80, respectively. FIG. 8A is a fragmentary cross-sectional view illustrative of the front end portion 16-1 of the bottom casing 16, and FIG. 8B is a front view thereof. As illustrated, a hole 84 of substantially circular configuration is formed through the bottom surface of the concave portion 80. The first electrode 36 is disposed along the inner surface of the hole 84. The second electrode 38 that is disposed on the concave portion 82 may be arranged similarly as shown in FIGS. 8A and 8B.

Figure 9A:
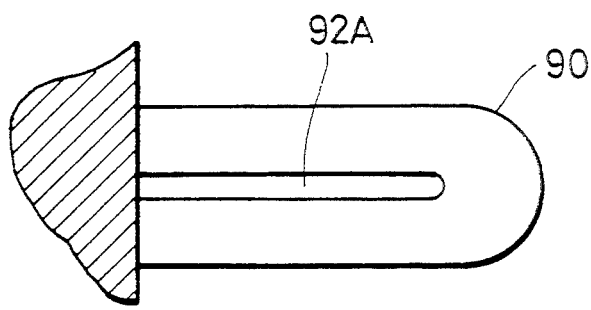
FIGS. 9A and 9B are schematic diagrams showing an example of connection terminals that are inserted into holes of the battery pack shown in FIG. 7, respectively.
Figure 9B:
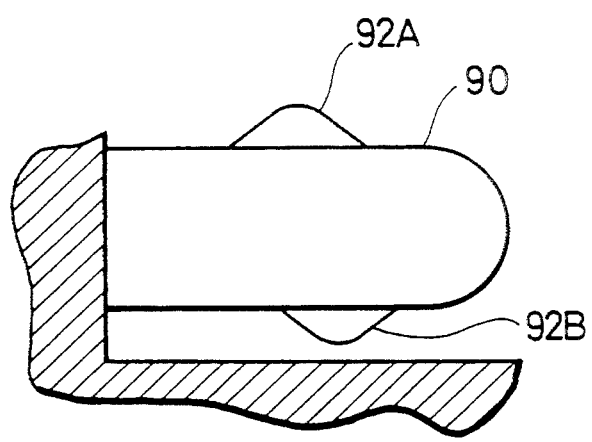

FIGS. 9A and 9B show an example of connection terminals 90 that are coupled to the electrodes 36, 38 of the battery pack 10. The connection terminals 90 are disposed on the battery accommodating portion of the battery charger or electrical machinery and apparatus. The connection terminal 90 has a columnar configuration corresponding to the hole of the battery pack 10, and two springs 92A, 92B are disposed on the columnar surface thereof.

FIG. 10 is a perspective view illustrative of an appearance of the battery pack 10 according to the first embodiment of the present invention. As shown in FIG. 10, the battery pack 10 includes a casing 18 which comprises an upper casing 14 and a bottom casing 16.

Figure 12:
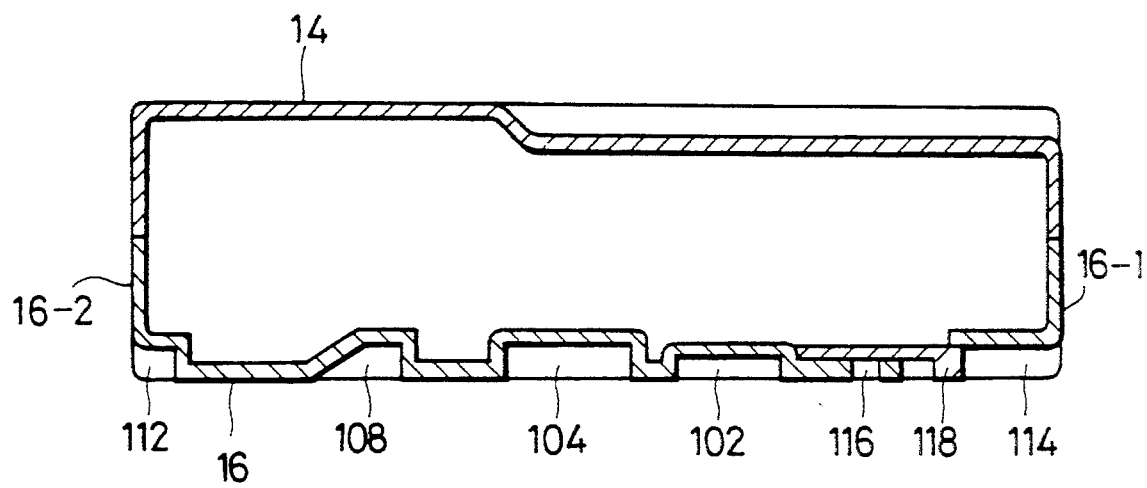
FIG. 12 is a cross-sectional view taken along the line XII—XII of FIG. 10.
Figure 11A:
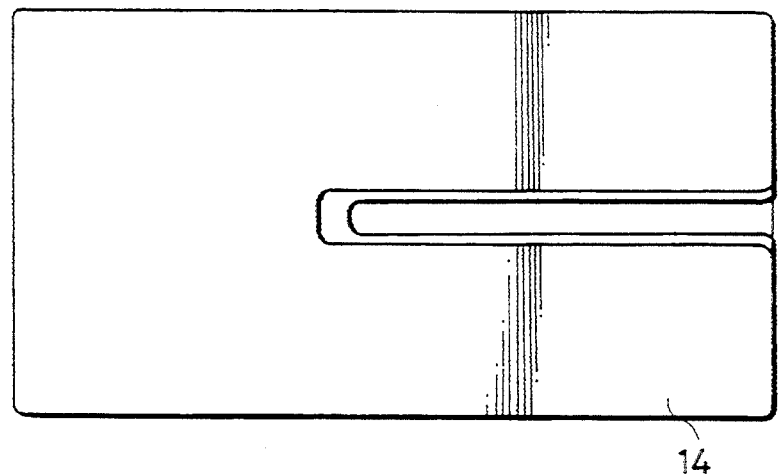
FIG. 11A is a plan view illustrative of a casing of the battery pack shown in FIG. 10.
Figure 11B:
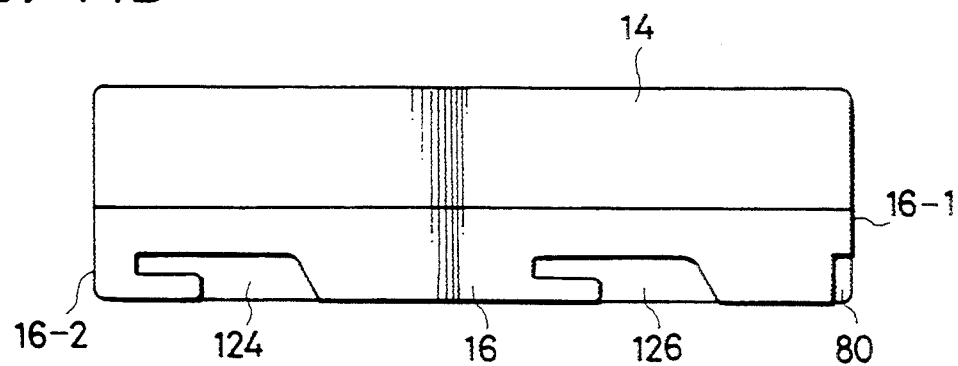
FIG. 11B is a side view thereof.
Figure 11C:
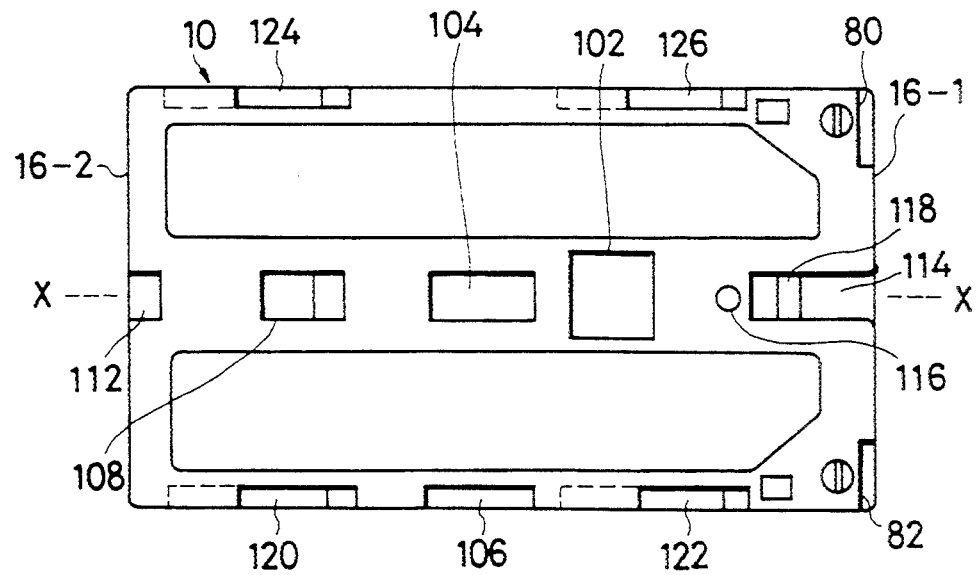
FIG. 11C is a bottom view thereof.
Figure 13A:
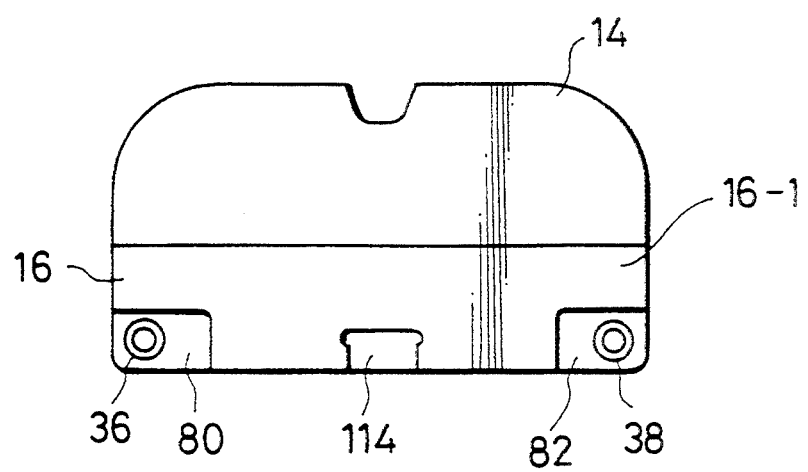
FIG. 13A is an end view illustrative of a front end portion of the battery pack shown in FIG. 10.

FIGS. 11A, 11B and 11C show in more detail the casing 18 of the battery pack 10. FIG. 11A is a plan view thereof, FIG. 11B is a side view thereof and FIG. 11C is a bottom view thereof. FIG. 12 is a cross-sectional view taken along the line XII—XII of FIG. 10. FIG. 13A is an end view illustrative of the front end portion of the battery pack 10 and FIG. 13B is a cross-sectional view taken along the line XIII—XIII of FIG. 10.

Figure 13B:
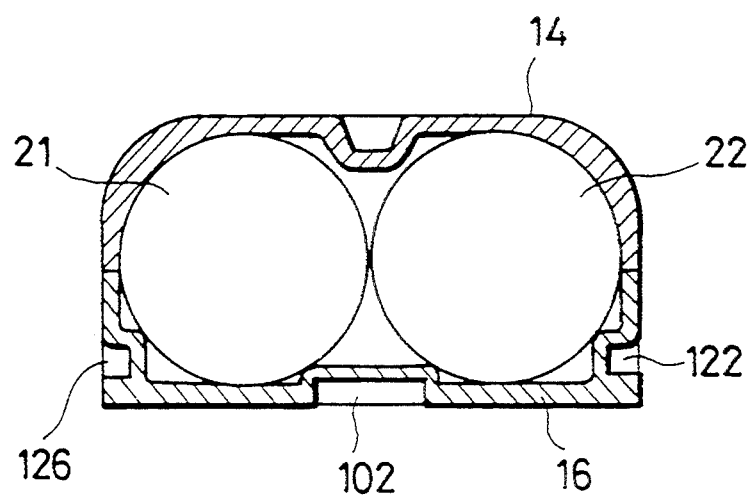
FIG. 13B is a cross-sectional view taken along the line XIII—XIII in FIG. 10.

As shown in FIG. 13B, according to this embodiment, the cylindrical batteries are disposed in two rows within the battery pack 10 and four batteries are accommodated within the battery pack 10 in total. Similar to the example of the prior art, the four batteries may be electrically connected in series to form a combination battery.

Referring to FIGS. 11A to 11C and FIG. 12, the bottom casing 16 of the battery pack 10 has on its bottom surface recessed portions 102, 104, 108, 112 formed along a center line X—X and a recessed portion 106 formed along the side portion thereof. The recessed portions 102, 104, 106 are used as detection apertures and the recessed portions 108, 112 are used as locking apertures.

Whether or not the battery pack 10 is properly attached to the battery charger can be detected by the detection apertures 102, 104, 106. The battery pack 10 that is attached to the battery charger can be supported at that position by the locking apertures 108, 112.

Holes 120, 122, 124 and 126, each having a rib, are formed around the bottom surface of the bottom casing 16. The holes 120 to 126 are adapted to receive corresponding protruded portions formed on the battery accommodating portion when the battery pack 10 is attached to the battery accommodating portion of the electrical machinery and apparatus.

Concave portions 80, 82 are formed on the front end portion 16-1 of the bottom casing 16. First and second electrodes 36, 38 of the combination battery are disposed on the bottom surfaces of the concave portions 80, 82 as shown in FIG. 13A.

The electrodes 36, 38 function as charging electrodes when the battery pack 10 is attached to the battery charger to charge the batteries. Also, the electrodes 36, 38 function as power supply electrodes when the battery pack 10 is attached to the electrical machinery and apparatus as a power source.

According to this embodiment, the detection apertures 102, 104 are formed on the bottom surface of the bottom casing 16 along the center line X—X and also at its substantially central portion so that, when the battery pack 10 is not properly attached to the battery charger, the battery pack 10 is considerably inclined by the protrusions (not shown) formed on the battery charger. Thus, there is the advantage that whether or not the battery pack 10 is properly attached to the battery charger can easily be detected.

Further, since the detection apertures 102, 104 are formed between the four batteries that are disposed in two rows, the battery pack 10 need not be increased in size even though the detection apertures 102, 104 are formed.

The front end portion of the bottom casing 16 has a marker formed along the center line X—X. The marker functions to determine whether or not the battery pack 10 was already charged or whether or not the battery pack 10 was finished in use.

Figure 14A:
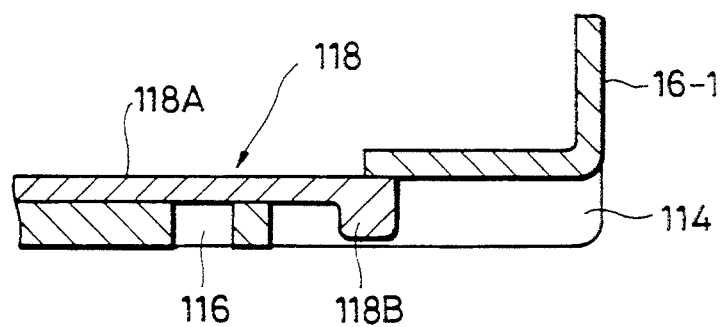
FIG. 14A is a side elevation view illustrative of an identification marker used in the present invention.
Figure 14B:
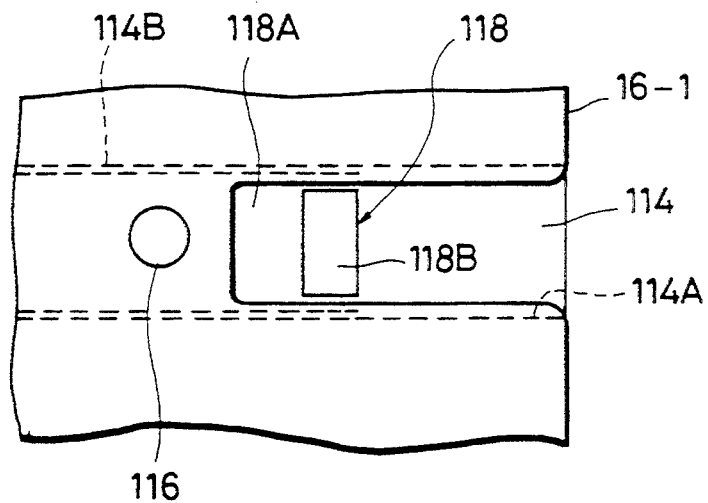
FIG. 14B is a plan view thereof.

FIG. 14A is a side elevation view of the marker, and FIG. 14B is a plan view thereof. As shown in FIGS. 14A and 14B, the marker comprises a concave portion 114 formed along the center line X—X (see FIG. 11C), a slider 118 disposed within the concave portion 114 so that it can be slidably moved therein, and an aperture 116 formed adjacent to the concave portion 114.

The slider 118 includes a plate portion 118A of substantially rectangular configuration and a protruded portion 118B disposed at the top of the plate portion 118A. The respective side portions of the plate portion 118A are in engagement with grooves 114A formed along the wall surfaces of the concave portion 114 so that the slider 118 can be slid along the center line X—X within the concave portion 114.

The concave portion 114 has on its rear portion formed a hole 114B to receive the plate portion 118A of the slider 118. When the slider 118 is moved inwardly along the center line X—X, the plate portion 118A is accommodated into the hole 114B.

A part of the lower side surface of the plate portion 118A of the slider 118 is exposed by the aperture 116 so that, if the lower side surface of the plate portion 118A is marked with a proper symbol or colored in proper color and the slider 118 is slid along the center line X—X, then the above-mentioned symbol or color can be visually confirmed through the aperture 116.

Even when the aperture 116 is not provided, if the slider 118 is moved outwardly along the center line X—X, then the plate portion 118A is ejected from the hole 114B of the concave portion 114 and the lower surface thereof is exposed so that such symbol or color can be visually confirmed.

The marker according to this embodiment is arranged as described above so that the identification mark on the slider 118 can be visually confirmed by slidably moving the slider 118. Thus, the user can know that the batteries in the battery pack 10 were already charged or finished in use.

Figure 15A:
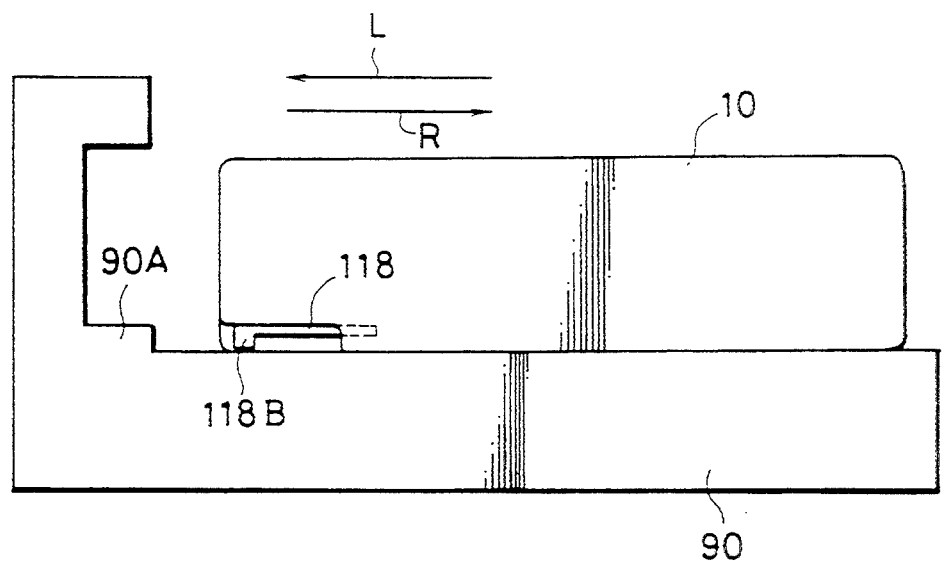
FIGS. 15A and 15B are diagrams showing the condition that an identification marker formed on a battery pack is in use, respectively.
Figure 15B:
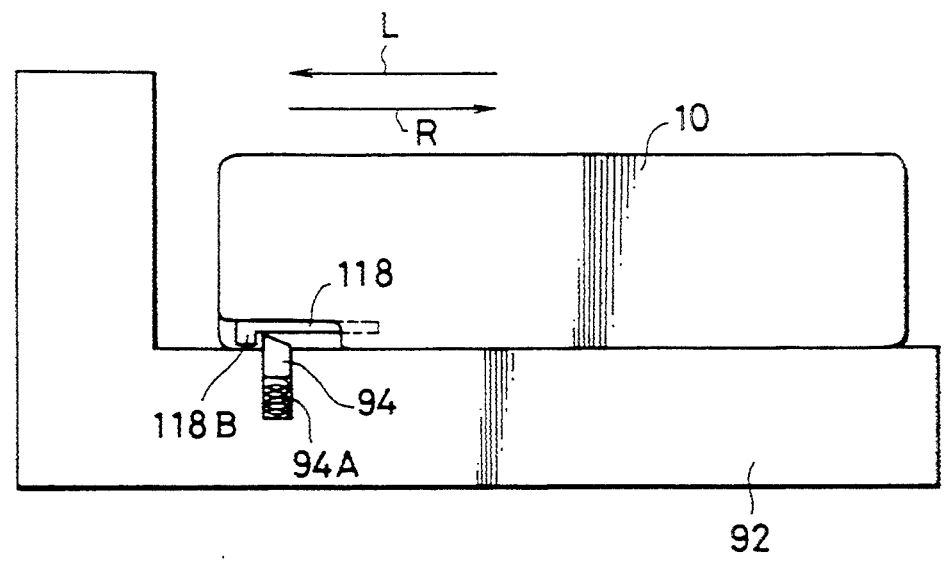

FIGS. 15A and 15B show the condition that the marker formed on the battery pack 10 is in use. More specifically, FIG. 15A shows the case that the battery pack 10 is attached to a battery accommodating portion 90 of electrical machinery and apparatus, and FIG. 15B shows the case that the battery pack 10 is attached to a battery charger 92.

In the example shown in FIG. 15A, the battery accommodating portion 90 of electrical machinery and apparatus includes a protrusion 90A so that, when the battery pack 10 is moved in the arrow L direction while it is in contact with the bottom surface of the battery accommodating portion 90, the protrusion 90A is engaged with the protruded portion 118B of the slider 118, thereby the slider 118 being pushed inwardly. Therefore, when the slider 118 is moved inwardly, the identification mark formed on the lower surface of the plate portion 118A, provides a proper identification symbol representative of the fact that the batteries in the battery pack 10 were finished in use which can be seen visually.

In the example shown in FIG. 15B, the battery charger 92 includes on its bottom surface an engagement member 94 that is upwardly spring-biased by a spring 94A, for example. The engagement member 94 has on its top formed an inclined surface.

Accordingly, if the battery pack 10 is attached to the battery charger 92 in the direction shown by an arrow L in FIG. 15B while it is in contact with the bottom surface of the battery charger 92, then the protruded portion 118B of the slider 118 is engaged with the engagement member 94, thereby moving the engagement member 94 downwardly.

If the battery pack 10 is ejected from the battery charger 92 in the arrow R direction in FIG. 15B after the charging was ended, the protruded portion 118B of the slider 118 is engaged with the engagement member 94 so that the slider 118 is withdrawn outwardly. Therefore, when the slider 118 is moved outwardly, the identifying symbol formed on the lower surface of the plate portion 118A, e.g., a proper identification symbol representing that the charging of batteries is finished, can be confirmed visually.

The slider 118 may be arranged so that the user can move the slider 118 manually. In such case, when the user moves the slider 118 with fingers, the identification symbol that the batteries were finished in use or that the batteries were already charged can be displayed.

Since the identification marker that determines that the batteries were finished in use or that they were already charged is formed on the bottom casing 16 as described above, increasing the battery pack 10 in size in its longitudinal direction can be avoided.

Figure 16:
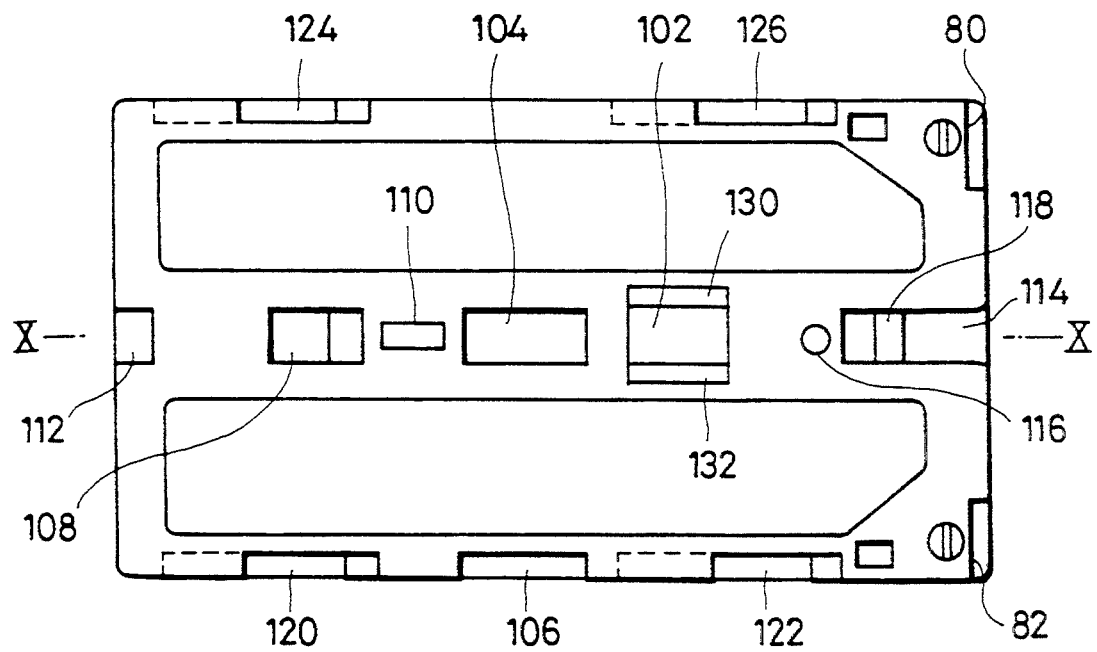
FIG. 16 is a bottom view illustrative of the battery pack according to a second embodiment of the present invention.

FIG. 16 shows the battery pack according to a second embodiment of the present invention. In this embodiment, as shown in FIG. 16, a detection aperture 110 is formed along the center line X—X. The detection aperture 110 has a width smaller than that of the adjacent locking aperture 108. That is, the width of the detection aperture 110 in the direction perpendicular to the center line X—X is smaller than the width of the locking aperture 108.

When the battery pack 10 is attached to the battery charger or the battery pack accommodating portion of electrical machinery and apparatus, a lock pin (not shown) whose size is matched to the locking aperture 108 is engaged with the locking aperture 108. If the dimension of the detection aperture 110 is larger than that of the locking aperture 108, then the lock pin may engage with the detection aperture 110 before it engages with the locking aperture 108.

Therefore, if the dimension of the detection aperture 110 is selected to be smaller than that of the locking aperture 108, then the lock pin, which should engage with the locking aperture 108, can be prevented from inadvertently engaging with the detection aperture 110.

Furthermore, as shown in FIG. 16, the battery pack 10 includes proper information elements 130, 132. The information elements 130, 132 may include a detector for detecting a temperature of battery, a voltage detector for detecting a remaining capacity of battery and an identifying apparatus for identifying the types of the batteries.

One of the information elements 130, 132 may be the temperature detecting element 42 as earlier noted in the example of the prior art. In such case, the third terminal 40 (see FIGS. 3A, 3B) from which the temperature detection signal of the temperature detection element 42 is output may be disposed at the proper position.

According to the present invention, whether or not the battery pack 10 is properly attached to the battery charger can easily be detected.

According to the present invention, whether or not the battery pack 10 is properly attached to the battery accommodating portion of electrical machinery and apparatus can easily be detected.

Further, according to the present invention, detection apertures can be formed on the bottom surface of the battery pack without increasing the dimension of the battery pack.

Furthermore, according to the present invention, an identification marker that is used to determine whether the batteries were finished in use or already charged can be provided without increasing the dimension of the battery pack 10

FIGS. 17A, 17B and FIGS. 18A, 18B show battery packs according to third and fourth embodiments of the present invention. In the third and fourth embodiments of the present invention, the electrodes 36, 38, i.e., output terminals 36, 38, are disposed on the front end portion 16-1 of the bottom casing 16 and the concave portions 80, 82 are not formed unlike the embodiment shown in FIG. 7.

As illustrated, apertures 102, 104 are formed through the front end portion 16-1 of the bottom casing 16, and the electrodes 36, 38 are disposed at the position very slightly spaced from the apertures 102, 104 inwardly. The electrodes 36, 38 are properly shaped so that they can receive and come in reliable contact with the connection terminals 90 of the corresponding battery charger or battery accommodating portion of electrical machinery and apparatus.

Figure 17A:
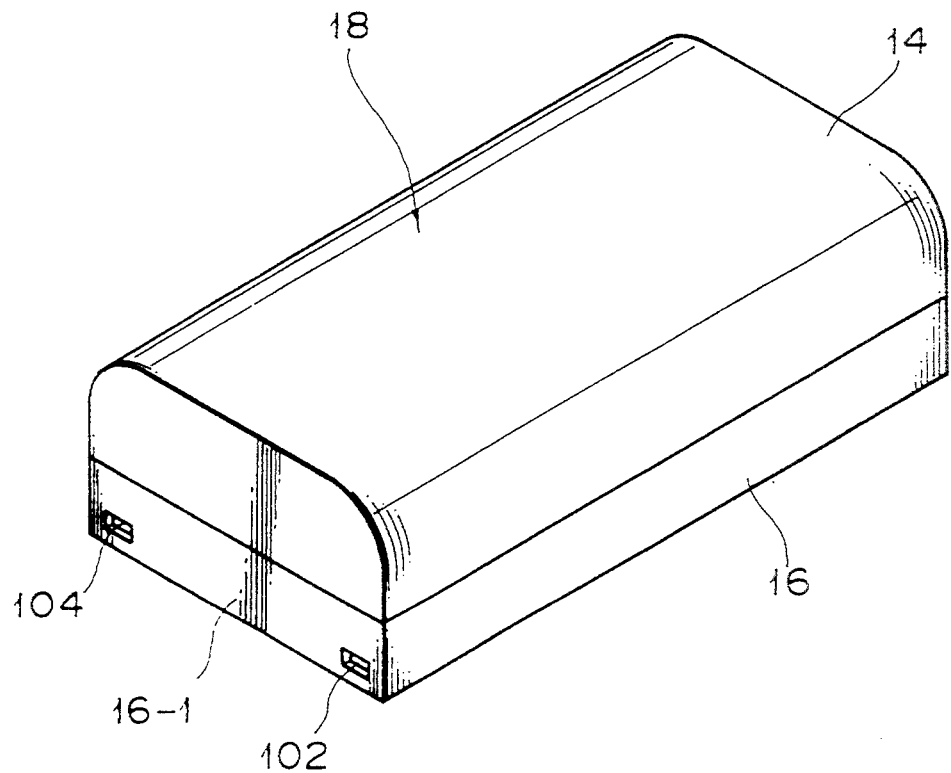
FIG. 17A is a perspective view illustrative of the battery pack according to a third embodiment of the present invention.
Figure 17B:
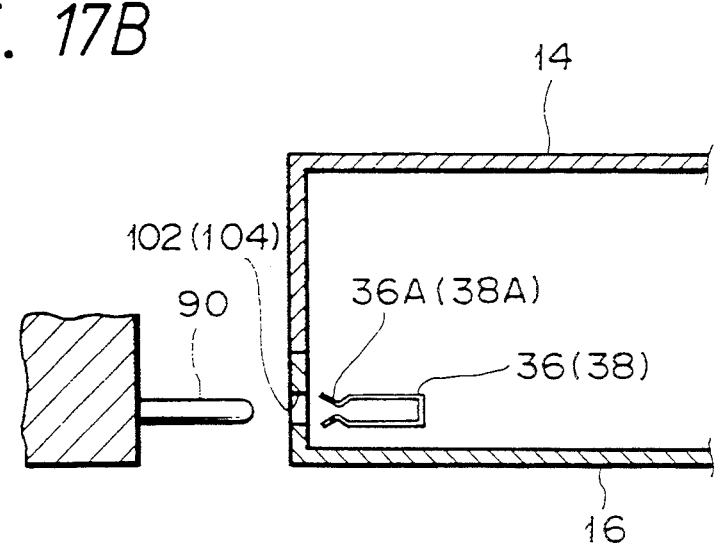
FIG. 17B is a fragmentary cross-sectional view of a main portion of the battery pack according to the third embodiment of the present invention.

In the third embodiment shown in FIGS. 17A, 17B, the apertures 102, 104 of the bottom casing 16 are rectangular in shape so as to accept the connection terminals 90 which are rectangular in cross section. The electrodes 36, 38 are made of thin plate materials which are curved in a U-shape. Contact portions 36A, 38A whose cross sections are small are formed at the entrances of the electrodes 36, 38.

Figure 18A:
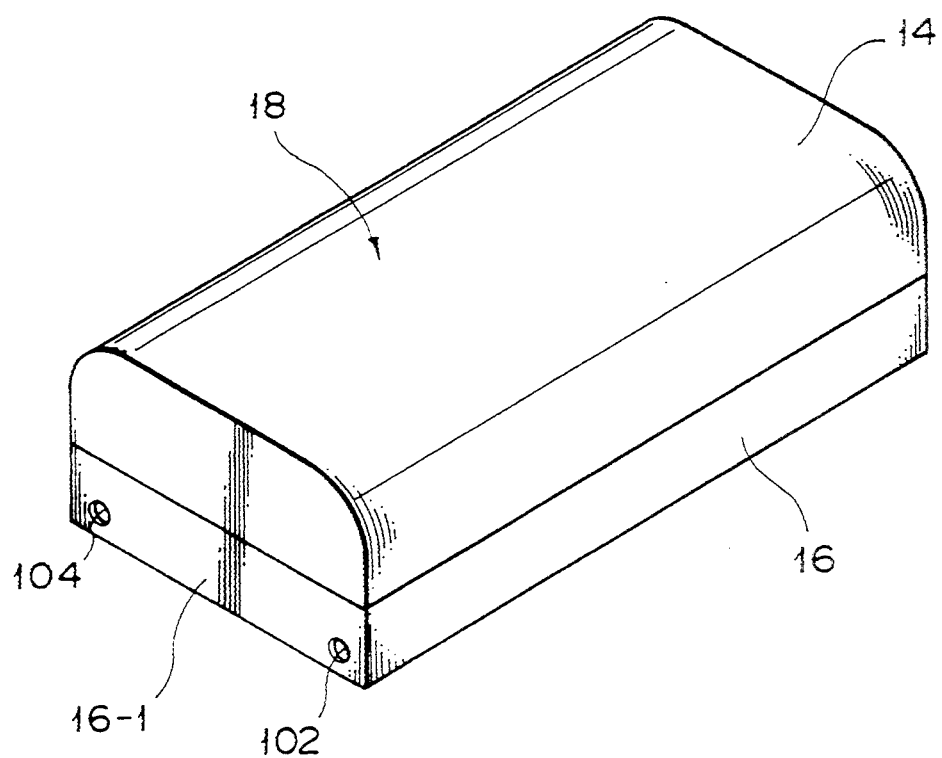
FIG. 18A is a perspective view illustrative of the battery pack according to a fourth embodiment of the present invention.
Figure 18B:
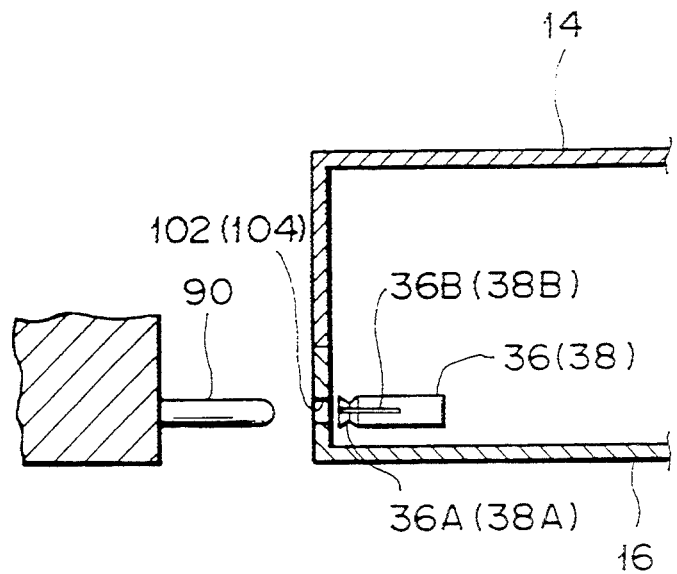
FIG. 18B is a fragmentary cross-sectional view of the battery pack according to the fourth embodiment of the present invention.

In the fourth embodiment shown in FIGS. 18A, 18B, the apertures 102, 104 of the bottom casing 16 are circular in shape so as to accept the connection terminals 90 which are circular in cross section. The electrodes 36, 38 are made of cylindrical thin plate members and have on their side surfaces slits 36B, 38B extended in the axial directions. Also, the contact portions 36A, 38A whose cross sections are small are formed at the entrances of the electrodes 36, 38.

As described above, the output terminals of the battery pack, i.e., the electrodes 36, 38 are disposed within the apertures or concave portions formed on the outer surface of the battery pack 10. Therefore, short-circuiting the two output terminals 36, 38 by contact with products made of conductive metal material such as key ring, necklace, chain or the like when the output terminals 36, 38 can be prevented.

According to the present invention, since the output terminals, i.e., electrodes 36, 38 are disposed in the inside of the hole 84 or apertures 102, 104 formed within the battery pack 10, the output terminals, i.e., electrodes 36, 38, contact with products made of conductive metal materials such as key ring, necklace, chain or the like can be prevented.

Furthermore, according to the present invention, since the output terminals, i.e., electrodes 36, 38 of the battery pack 10 contact can be protected from coming into contact with products made of conductive metal materials such as key ring, necklace, chain or the like, damage to the batteries accommodated within the battery pack 10 resulting from a short-circuit can be prevented.

The battery pack according to fifth and sixth embodiments of the present invention will hereinafter be described with reference to FIGS. 19A, 19B and FIGS. 20A, 20B. In FIGS. 19A, 19B and FIGS. 20A, 20B, like parts corresponding to those of FIG. 7, FIGS. 8A, 8B and FIGS. 9A, 9B are marked with the same references and therefore need not be described in detail.

In the example shown in FIG. 7 and FIGS. 8A, 8B, the hole 84 bored through the concave portion 80 includes a closed bottom portion and the hole 84 tends to collect dusts or the like. If the hole 84 collects dusts or the like, then an electrical connection failure frequently occurs between the electrodes 36, 38 of the battery pack 10 and the connection terminals 90 of the battery charger or electrical machinery and apparatus.

Figure 19A:
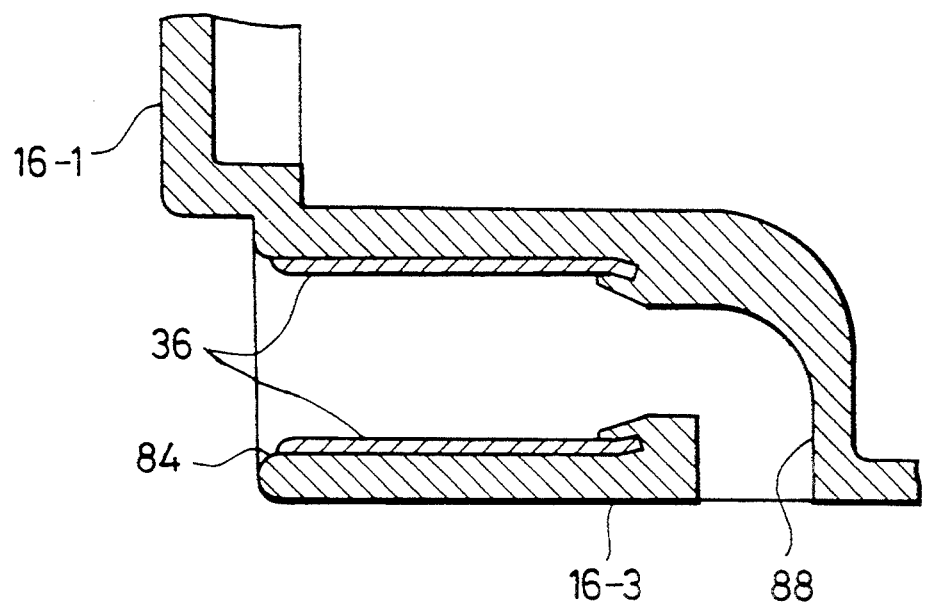
FIG. 19A is a fragmentary cross-sectional view illustrative of a front end portion of a bottom casing of the battery pack according to a fifth embodiment of the present invention.
Figure 19B:
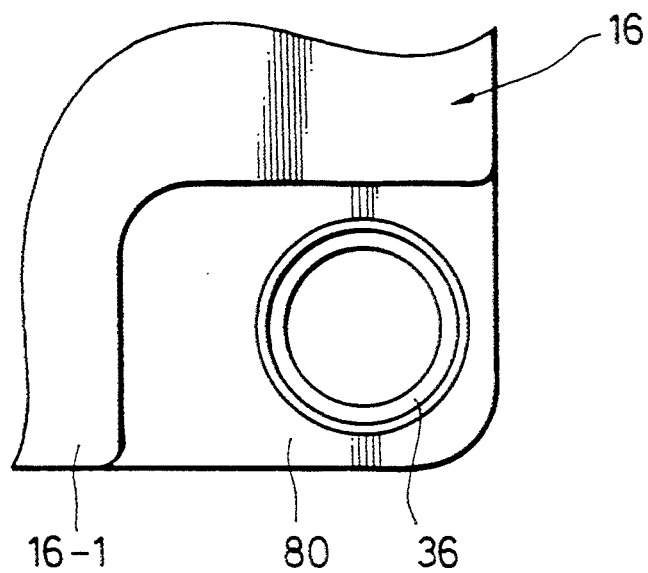
FIG. 19B is a front view thereof.

FIGS. 19A, 19B show in detail the front end portion of the battery pack 10 of the present invention. FIGS. 19A, 19B correspond to FIGS. 8A, 8B. FIG. 19A is a fragmentary cross-sectional view illustrative of the front end portion 16-1 of the bottom casing 16 and FIG. 19B is a front view thereof.

As illustrated, the concave portions 80, 82 are formed on the front end portion 16-1 of the bottom casing 16. Holes 84, 86 are respectively formed on the concave portions 80, 82. The output terminals of the combination battery, i.e., first and second electrodes 36, 38 are disposed on the bottom surfaces of the holes 84, 86.

The electrodes 36, 38 function as the charging electrodes when the battery pack 10 is attached to the battery charger for charging the batteries. Whereas, the electrodes 36, 38 function as the power supply electrodes used when the battery pack 10 is attached to the electrical machinery and apparatus as the power supply.

FIGS. 19A, 19B show examples of structures of one side of the holes 84, 86 respectively formed on the concave portions 80, 82 and the first and second electrodes 36, 38 respectively disposed on the holes 84, 86, i.e., the first hole 84 and the first electrode 36 disposed in the first hole 84. The second hole 86 and the second electrode 38 disposed in the second hole 86 may be arranged similarly to the first hole 84 and the first electrode 36 disposed in the first hole 84 shown in FIGS. 19A, 19B.

As shown in FIGS. 19A, 19B, the concave portion 80 has on its bottom surface formed the hole 84 of substantially circular configuration and the first electrode 36 is disposed along the inner surface of the first hole 84.

Comparison of FIGS. 19A, 19B with FIGS. 8A, 8B reveals that, in this embodiment, an aperture 88 for discharging dusts or the like is formed on the bottom portion of the hole 84 and that the aperture 88 is elongated from the bottom portion of the hole 84 to the bottom surface 16-3 of the bottom casing 16.

Therefore, the hole 84 and the aperture 88 constitute a through-hole that is extended from the front end portion 16-1 to the bottom surface 16-3 of the bottom casing 16. Thus, even when dusts or the like enter the hole 84, such dusts or the like can be discharged to the outside of the battery pack 10 through the aperture 88 from the bottom of the hole 84.

Figure 20A:
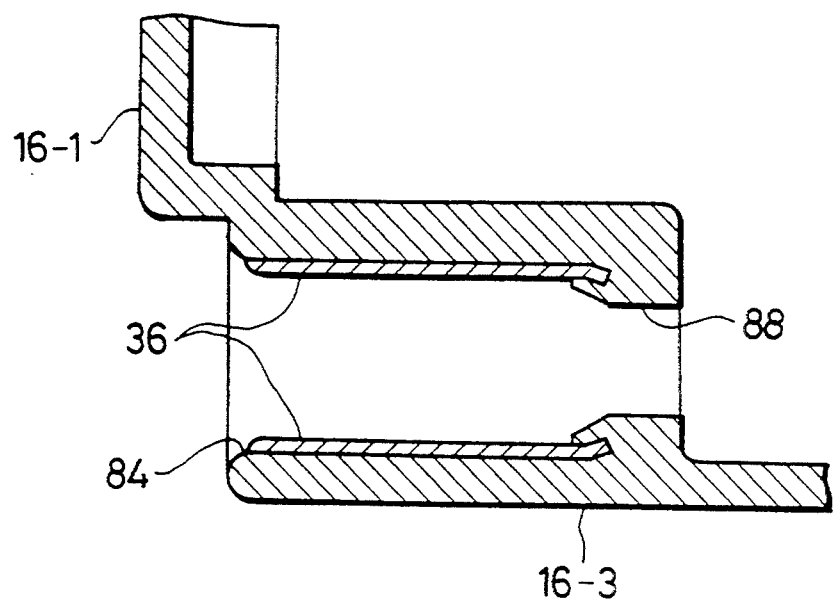
FIG. 20A is a fragmentary cross-sectional view illustrative of a front end portion of a bottom casing of the battery pack according to a sixth embodiment of the present invention.
Figure 20B:
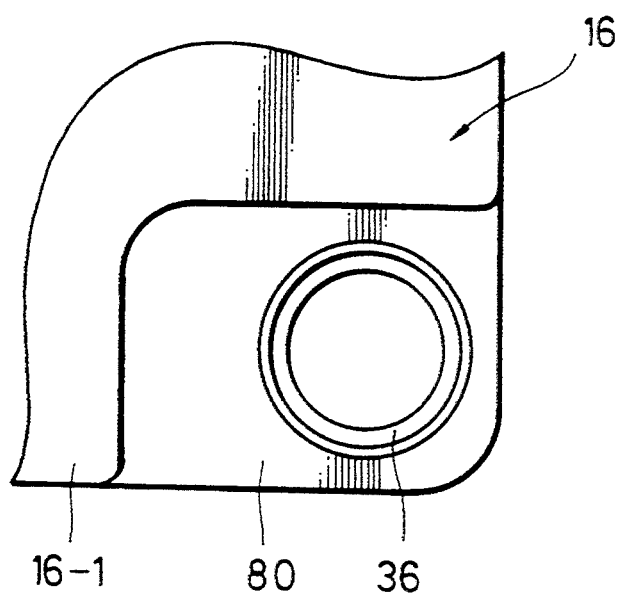
FIG. 20B is a front view thereof.

FIGS. 20A, 20B show the battery pack 10 according to a sixth embodiment of the present invention. In this embodiment, the aperture 88 bored through the bottom portion of the hole 84 is inwardly extended to the battery pack 10. Therefore, by means of the aperture 88, the bottom portion of the hole 84 is coupled to the inside of the casing 18 but is not coupled to the outside of the casing 18. In this embodiment, dusts or the like entered the hole 84 are inwardly discharged to the battery pack 10 through the aperture 88 from the bottom portion of the hole 84.

According to the fifth and sixth embodiments of the present invention, since dusts or the like entered the hole 84 are discharged to the outside of the hole 84 through the aperture 88 from the bottom portion of the hole 84, accumulation of dusts or the like in the bottom portion of the hole 84 can be avoided.

Incidentally, as shown in FIGS. 19A, 19B, it is preferred that the aperture 88 for discharging dusts or the like is formed at the central portion of the bottom portion of the hole 84 and the outside surface of the discharging aperture 88 may be formed as a smoothly-curved surface by a chamfer treatment. Thus, even when dusts or the like enter the bottom portion of the hole 84, if the connection terminal 90 shown in FIGS. 9A, 9B is inserted into the hole 84, then dusts or the like are pushed by the connection terminal 90 and can be discharged to the outside from the aperture 88 by force.

According to the present invention, since dusts or the like entered the hole 84 formed in the battery pack 10 to dispose therein the electrode are discharged from the discharging aperture 88 bored though the aperture 84, advantageously the accumulation of dusts or the like in the bottom portion of the hole 84 can be prevented.

Furthermore, according to the present invention, since the accumulation of dusts or the like in the hole 84 formed in the battery pack 10 to dispose therein the electrode can be prevented, advantageously an electrical connection failure resulting from the accumulation of dusts or the like on the hole 84 can be avoided.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A battery pack comprising:
   a casing for housing batteries, said casing having an upper portion and a bottom portion;
   a plurality of electrodes formed in said bottom portion of said casing for electrical connection with said batteries, said electrodes functioning as charging electrodes when said battery pack is connected to a battery charger and said electrodes functioning as power supply electrodes when said battery pack is connected to an electrical apparatus; and
   a detection recess formed along a center line on a bottom surface of said bottom portion of said casing for detecting when said pack is positioned correctly in an appropriate battery charger or electrical apparatus, wherein columnar batteries are accommodated in said casing in two rows extending along opposite sides of said center line of said bottom surface and wherein said detection recess is formed along said center line in between said two rows.

2. The battery pack according to claim 1, further comprising a locking aperture formed substantially adjacent to said detection recess wherein said detection recess is smaller in width in the direction perpendicular to said center line than said locking aperture.

3. The battery pack according to claim 1, further comprising information elements disposed along said center line.

4. The battery pack according to claim 3, wherein said information elements include a temperature detector and a voltage detector for detecting the remaining capacity of said battery pack.

5. The battery pack according to claim 1, wherein, said detection recess is formed at a central point along said center line.

6. The battery pack according to claim 1, wherein said detection recess is a first detection recess formed at a center point equidistant from first and second ends of said center line and further comprising:
   a second detection recess formed on said center line between said first end of said center line and said first detection recess, and
   at least one locking aperture disposed on said center line between said first detection recess and said second end of said center line.

7. The battery pack according to claim 6, further comprising a third detection recess disposed on said center line between said first detection recess and said at least one locking aperture, said third detection recess being smaller in width in the direction perpendicular to said center line than a locking aperture of said at least one of said locking apertures substantially adjacent to said third detection recess.

8. The battery pack according to claim 7, further comprising another detection recess disposed on said bottom surface on the other side of one of said columnar batteries from said center line.

9. A battery pack comprising:
   a casing having an outer surface and at least two rows for accommodating batteries therein, said outer surface of said casing having a bottom surface and a detection recess formed along a center line of said bottom surface of said casing, and
   wherein columnar batteries are accommodated in two rows in said casing and said detection recess is disposed between said two rows of batteries along said center line of said bottom surface; and
   an identification marker disposed along said center line of the bottom surface for indicating that the battery pack was finished in use or that the battery pack was already charged.

10. The battery pack according to claim 9, wherein said identification marker includes a slidable slider and said slider has a protruded portion.

11. A battery pack according to claim 9, comprising:
   an output terminal formed on the inside of a hole bored through said outer surface of said casing.

12. A battery pack according to claim 9, further comprising an output terminal disposed within an aperture at a concave portion of said outer surface of said casing, and
   said aperture extending from said concave portion of said outer surface of said casing to within said casing.

13. The battery pack according to claim 12, wherein said aperture extends from a bottom portion of said concave portion at a side of said casing to the outer surface of said casing at said bottom surface.

14. The battery pack according to claim 12, wherein said aperture extends from the bottom portion of said concave portion and terminates inside said casing.

15. The battery pack according to claim 9, wherein, said detection recess is formed at a central point along said center line.

16. The battery pack according to claim 9, wherein said detection recess is a first detection recess formed at a central point along said center line and said identification marker is formed between said columnar batteries at one end of said center line, and further comprising:
   a second detection recess formed on said center line between said identification marker and said first detection recess, and
   at least one locking aperture disposed on said center line between said first detection recess and the other end of said center line opposite the end with the identification marker.

17. The battery pack according to claim 9, further comprising another detection recess disposed on said bottom surface on the other side of one of said columnar batteries from said center line.

18. The battery pack according to claim 16, further comprising a third detection recess disposed on said center line between said first detection recess and said at least one locking aperture, said third detection recess being smaller in width in the direction perpendicular to said center line than a locking aperture of said at least one of said locking apertures substantially adjacent to said third detection recess.

19. A battery pack having a battery accommodated therein comprising:
   a casing for housing said battery, said casing having an upper portion and a bottom portion, a bottom surface of said bottom portion having a concave portion at one end thereof;
   a plurality of electrodes formed in said bottom portion of said casing for electrical connection with said battery, said electrodes functioning as charging electrodes when said battery pack is connected to a battery charger and said electrodes functioning as power supply electrodes when said battery pack is connected to an electrical apparatus;
   a marker slidably disposed on said concave portion of said bottom surface, said marker forming a sliding plate and said marker having an enlarged protruding section at one end thereof;

a hole formed in said concave portion for receiving the sliding plate of said marker opposite the protruding section; and an aperture formed adjacent to said concave portion in said bottom portion for viewing the position of said sliding plate; whereby said sliding marker slides into said hole when said pack is connected to an electrical apparatus and said aperture visually showing such position thereby indicating that the battery has been used, and said sliding marker is moved in the opposite direction to an opposite position by said protruding section when said pack is removed from a battery charger and said aperture visually showing such position thereby indicating that the battery has been charged.

20. A battery pack according to claim 19, wherein sliding plate is marked in different colors, whereby one color will be visible through said aperture when said sliding plate is in said position showing said battery has been used and another color will be visible through said aperture when said sliding plate is in said position showing said battery has been charged.

21. A battery pack according to claim 19 further comprising a detection aperture formed along a center line of a bottom surface of said bottom portion of said casing for detecting when said pack is properly positioned in a battery charger.

22. A battery pack according to claim 21, wherein a plurality of columnar batteries is accommodated in said casing in two rows, one row each along one side of said center line of said bottom surface of said bottom portion of said casing and wherein said detection aperture formed along said center line is in between said two rows.

23. A battery pack having a battery means accommodated therein comprising:

a casing for housing said battery means inside, said casing having an upper portion and a bottom portion;

a plurality of electrodes formed in a plurality of corresponding apertures, said apertures being disposed within said casing at a side of said bottom portion of said casing for electrical connection with said battery means, said electrodes functioning as charging electrodes when said battery pack is connected to a battery charger and said electrodes functioning as power supply electrodes when said battery pack is connected to an electrical apparatus, wherein each of said plurality of apertures extends from said side of said bottom portion of said casing to the inside of said casing, whereby any dust accumulating on said electrodes may be discharged through each of said apertures into said casing.

24. A battery pack according to claim 23, wherein each of said plurality of apertures extends further from inside said casing to a bottom surface of said bottom portion of said casing, whereby any dust accumulating on said electrodes may be discharged from said battery pack through said aperture.

25. A battery pack according to claim 23, said side portion has concave portions with bottom surfaces;

each of said apertures has one end which comprises a hole in a respective bottom surface of a concave portion of said side portion.

26. A battery pack according to claim 24, said side portion has concave portions with bottom surfaces;

each of said apertures comprising a hole in a respective bottom surface of a concave portion of said side portion.

* * * * *